(12) United States Patent
Jousset

(10) Patent No.: US 6,235,194 B1
(45) Date of Patent: May 22, 2001

(54) RECHARGE AND FILTER ASSEMBLY WITH REPLACEABLE CARTRIDGE

(75) Inventor: Todd A. Jousset, Ceres, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/520,433

(22) Filed: Mar. 8, 2000

(51) Int. Cl.[7] ............................. B01D 27/10; B01D 35/34
(52) U.S. Cl. ................... 210/206; 210/438; 210/440; 210/450; 210/453; 210/454; 210/497.01
(58) Field of Search ................. 210/198.1, 206, 210/209, 438, 440, 443, 450, 451, 452, 453, 454, 493.1, 493.2, 497.01

(56) References Cited

U.S. PATENT DOCUMENTS

| 2,696,915 | * | 12/1954 | Kasten et al. ................ 210/453 |
| 3,122,501 | | 2/1964 | Hultgren . |
| 3,291,314 | * | 12/1966 | Rosaen ....................... 210/497.01 |
| 4,246,109 | | 1/1981 | Manders . |
| 4,333,516 | | 6/1982 | Krueger et al. . |
| 4,668,393 | * | 5/1987 | Stone ............................ 210/493.2 |
| 4,782,891 | | 11/1988 | Cheadle et al. . |
| 4,834,885 | | 5/1989 | Misgen et al. . |
| 5,024,268 | | 6/1991 | Cheadle et al. . |
| 5,290,445 | | 3/1994 | Buttery . |
| 5,441,637 | | 8/1995 | Gutjahr et al. . |
| 5,462,675 | | 10/1995 | Hopkins et al. . |
| 5,643,446 | | 7/1997 | Clausen et al. . |
| 5,695,633 | | 12/1997 | Ernst et al. . |
| 5,707,518 | | 1/1998 | Coates et al. . |
| 5,753,116 | * | 5/1998 | Baumann et al. .................. 210/206 |
| 5,807,481 | | 9/1998 | Hodgkins et al. . |
| 5,891,334 | | 4/1999 | Gundrum et al. . |
| 6,113,781 | * | 9/2000 | Popoff et al. ................. 210/497.01 |

* cited by examiner

Primary Examiner—Matthew O. Savage
(74) Attorney, Agent, or Firm—Christopher H. Hunter

(57) ABSTRACT

A recharge and filter assembly includes a housing with a removable recharge and filter cartridge. The housing includes a canister with a removable cover allowing access to the cartridge. The cartridge includes a filter element comprising a ring of media and upper and lower end caps. The upper end cap carries a peripheral seal which provides a fluid-tight seal with the housing canister. An annular channel is provided between an annular portion of the upper end cap and the seal. An annular support member from the cover is received in the annular channel to support the upper end cap. Latching fingers on the upper end cap and a mating ring on the cover removably couple the cartridge to the cover. The cartridge further includes a recharge canister supported by tabs on the upper and lower end caps. Fluid is recharged by inhibitor material, while particulates and other contaminants are removed by the filter media.

31 Claims, 6 Drawing Sheets

Fig. 6

RECHARGE AND FILTER ASSEMBLY WITH REPLACEABLE CARTRIDGE

FIELD OF THE INVENTION

The present invention relates generally to fluid filters and conditioners, and more particularly to filters and conditioners for liquid coolant.

BACKGROUND OF THE INVENTION

In certain fluid systems, for example in cooling systems for internal combustion engines, a liquid coolant degrades over time as it recirculates through the system. It can be necessary or desirable to recharge the coolant by releasing inhibitors into the flow. This is done by locating a recharge assembly, including a housing and a replaceable recharge canister, in the liquid line.

It is also known to add a filter assembly, including a housing and replaceable filter element, to the cooling system in order to remove particulates such as rust, scale and dirt. Such a filter assembly, however, requires additional space in the engine compartment in addition to the recharge assembly. Both the filter element and recharge canister also must be separately accessed from their respective housings and replaced when they become spent.

The amount of space available for the recharge assembly and filter assembly is limited. So too is the time and effort available to access both assemblies for replacement of the recharge canister and filter element. It is believed that it would be advantageous to combine the recharge assembly and filter assembly into an integral, compact assembly. It is also believed it would be advantageous to provide such an assembly where the filter element and recharge canister are combined into a cartridge, which can be easily accessed and removed as a single component when spent. It is further believed advantageous that such a recharge and filter assembly be robust, dependable and low in cost.

SUMMARY OF THE PRESENT INVENTION

The present invention provides a novel and unique recharge and filter assembly which combines a recharge assembly and filter assembly into an integral, compact assembly. The recharge and filter assembly includes a replaceable recharge and filter cartridge, which can be easily accessed and removed as a single component when spent. The assembly has components which are relatively easy to manufacture, are low in manufacturing and maintenance costs, and have a long life. The recharge and filter assembly is particularly suited to be located within the liquid line in a cooling system of an internal combustion engine to recharge coolant in the system, as well as to remove particulate matter and other contaminants.

According to the present invention, the recharge and filter assembly includes a housing having a cylindrical canister with an inlet and outlet at a closed end of the canister, and a cover which can be removably screwed onto an open end of the canister. A short standpipe extends centrally within the housing from the closed end towards the open end. The standpipe includes an internal passage fluidly connected to the housing outlet.

The recharge and filter cartridge is received within the canister of the housing, and includes a filter element portion and a recharge canister portion. The filter element portion has a ring-shaped media and upper and lower end caps. A peripheral flow passage is defined between the radially outer surface of the filter media and the housing canister. A cylindrical imperforate weir supports the inner surface of the filter element, and extends along the filter element from the lower end towards the upper end. A flow passage is provided between the upper end of the weir and the upper end cap.

The lower end cap of the filter element includes an annular body portion fixed to the lower end of the filter media, and defining a central opening. An annular resilient seal bounds the central opening and seals against the central standpipe when the element is located within the housing. The housing canister includes an annular radially-inward projecting shoulder which supports the lower surface of the lower end cap toward the closed end of the housing. The lower end cap includes a series of ribs on its lower surface, which are supported on the annular shoulder and define flow paths between the lower end cap and the peripheral flow passage.

The upper end cap of the filter element also includes an annular body portion fixed to the upper end of the filter media. The upper end cap includes a radially outward-projecting annular flange portion with a radially outward-facing groove which receives an annular resilient O-ring. When the filter element is located in the housing, the O-ring seals against a gland proximate the open end of the canister to prevent fluid passing into the area between the upper end cap and the cover. An annular channel, facing axially upward from the upper end cap, is provided in the annular flange portion between the annular body portion and the seal. An outer annular support ring projecting downward from the cover is received within the annular channel and supports the upper end cap during operation.

The upper end cap further includes a well area extending radially inward from the annular body portion. A series of latching fingers extend upwardly from the well area, and cooperate with a downwardly-extending mating ring from the cover to couple the recharge and filter cartridge to the cover. The cooperating latching fingers and mating ring facilitate removing and replacing the recharge and filter cartridge when spent. The mating ring on the cover also contacts the well area in the upper end cap to support the upper end cap during operation.

The recharge canister portion of the cartridge is supported internally of the filter element. An annular flow passage is provided between the recharge canister and the cylindrical weir supporting the filter media. The recharge canister includes a cylindrical body portion enclosing inhibitor material, and annular side walls projecting axially from the upper and lower ends of the body portion. The upper side wall is sealed to the upper end of the weir, and includes a series of flow openings, preferably equally spaced around the side wall. The upper side wall of the recharge canister is supported on a series of tabs formed integral with the upper end cap. The tabs on the upper end cap support the upper side wall at a location spaced apart from the upper end cap such that flow openings are provided between each of the tabs on the upper end cap. The lower side wall of the canister is supported on a series of tabs formed integral with the lower end cap. The tabs on the lower end cap similarly support the lower side wall of the recharge canister such that flow passages are provided between the tabs on the lower end cap.

The fluid flow to be recharged and filtered enters through the housing inlet and passes through the flow paths defined between the ribs on the lower end cap into the peripheral flow passage between the filter element and canister. The flow then passes radially inward through the filter media, where the flow is filtered, and then passes through the flow passage defined between the upper end cap and the upper end of the weir. The liquid then comes into contact with the inhibitor at the upper end of the recharge canister, where the liquid is recharged. The recharged liquid then flows through the flow openings in the upper annular side wall of the recharge canister, and then downwardly through the flow passage defined between the recharge canister and the weir. The flow then passes through the passages defined between the tabs on the lower end cap, and enters the central standpipe, where the flow then passes to the housing outlet.

Sensors mounted to the housing monitor outlet fluid temperature and the integrity of the recharge canister, to confirm when the cartridge needs to be replaced. To replace the recharge and filter cartridge, the cover is removed from the housing canister. The recharge and filter cartridge is removed with the cover because of the cooperating mating ring on the housing cover and the latching fingers on the upper end cap. The cartridge can be easily uncoupled from the cover and thrown away, and a new cartridge installed in the housing.

Thus, as described above, the present invention provides an integral, compact recharge and filter assembly. The recharge and filter assembly includes a recharge and filter cartridge that is easily accessed and removed from the housing as a single component when spent. The robust, dependable assembly also is relatively easy to manufacture, has low manufacturing and maintenance costs, and has a long life. The assembly can be located in a liquid line of the cooling system to recharge liquid coolant and filter particulates and other contaminants.

Further features of the present invention will become apparent to those skilled in the art upon reviewing the following specification and attached drawings.

DETAILED DESCRIPTION OF THE PREFERRED EMBODIMENT

Figure 1:
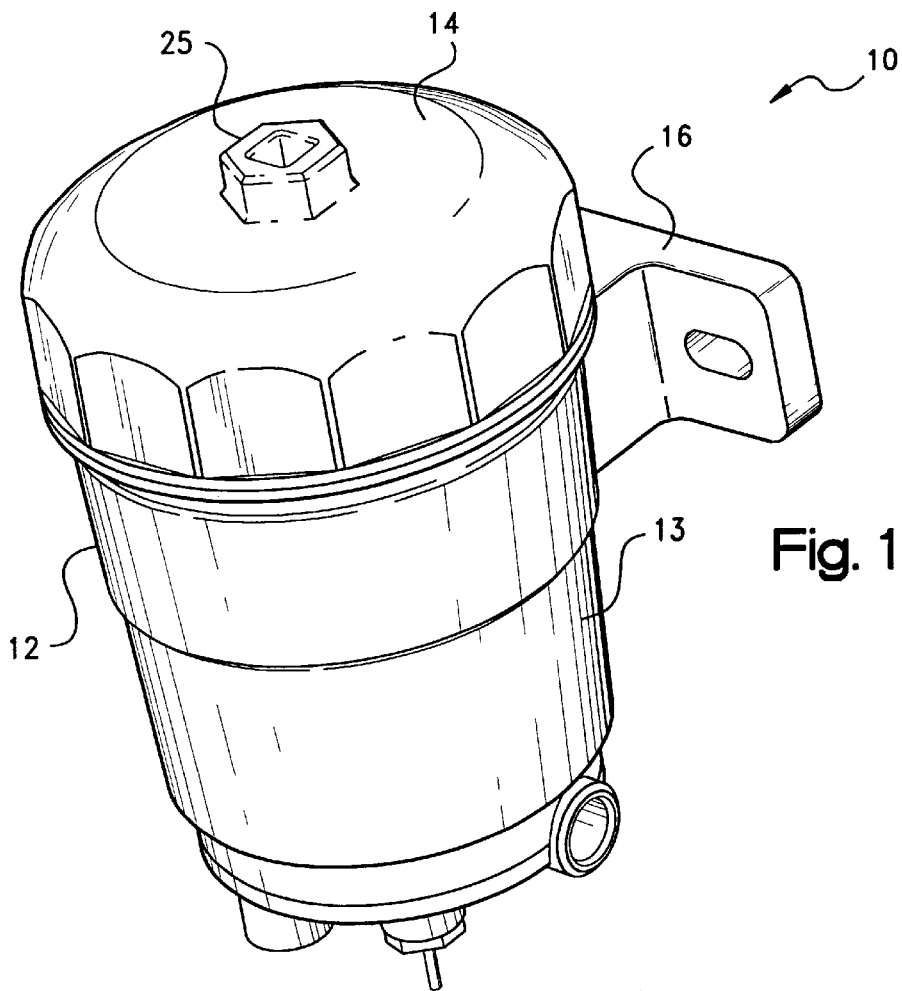
FIG. 1 is an elevated perspective view of a recharge and filter assembly constructed according to the principles of the present invention.
Figure 2:
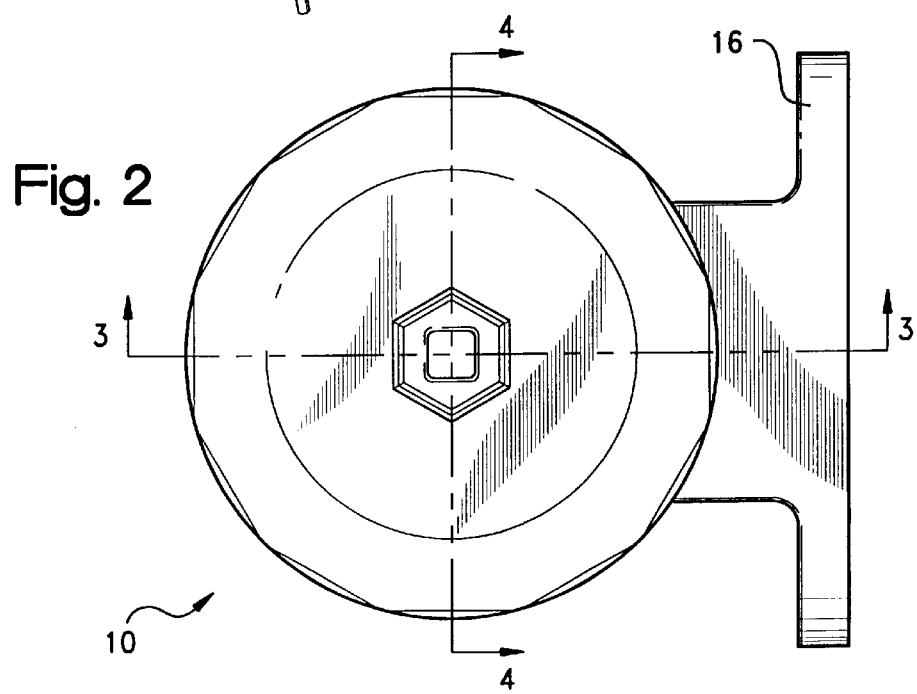
FIG. 2 is an upper end view of the assembly of FIG. 1.

Referring to the drawings, and initially to FIGS. 1 and 2, a recharge and filter assembly constructed according to the principles of the present invention is indicated generally at 10. The assembly includes an outer housing 12 comprising a cylindrical canister 13, and a removable cover 14. The housing 12 can be secured at an appropriate location within a fluid system such as with bracket 16. The canister 13 and cover 14 are formed from appropriate material (e.g., aluminum, plastic) using appropriate commercial techniques (e.g., stamping, molding, etc.) The recharge and filter assembly 10 is particularly useful to recharge coolant and filter particulate matter in a cooling system of an internal combustion engine, however, it is possible the assembly could be useful in other applications as well.

Figure 3:
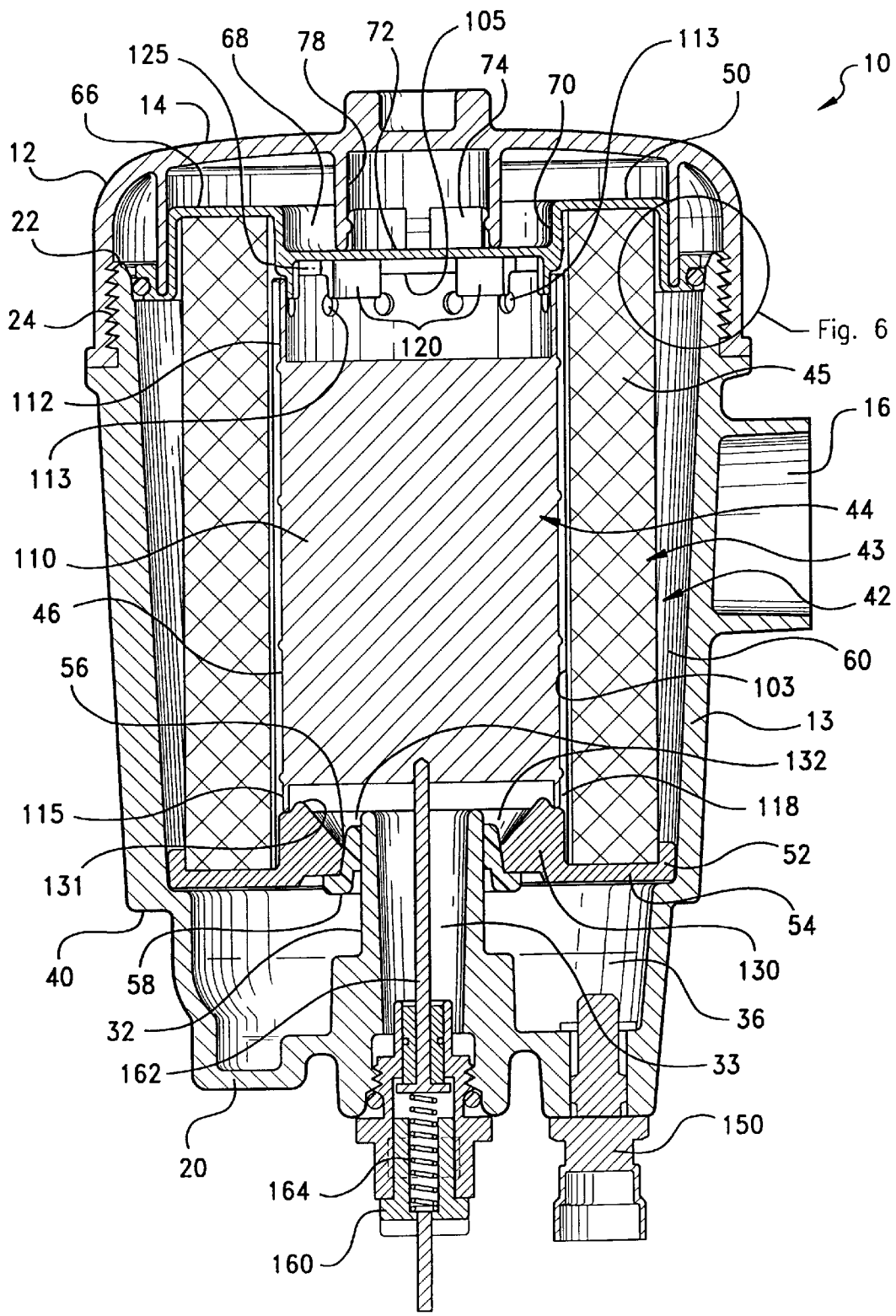
FIG. 3 is a cross-sectional side view of the assembly taken substantially along the plane described by the lines 3—3 in FIG. 2.
Figure 4:
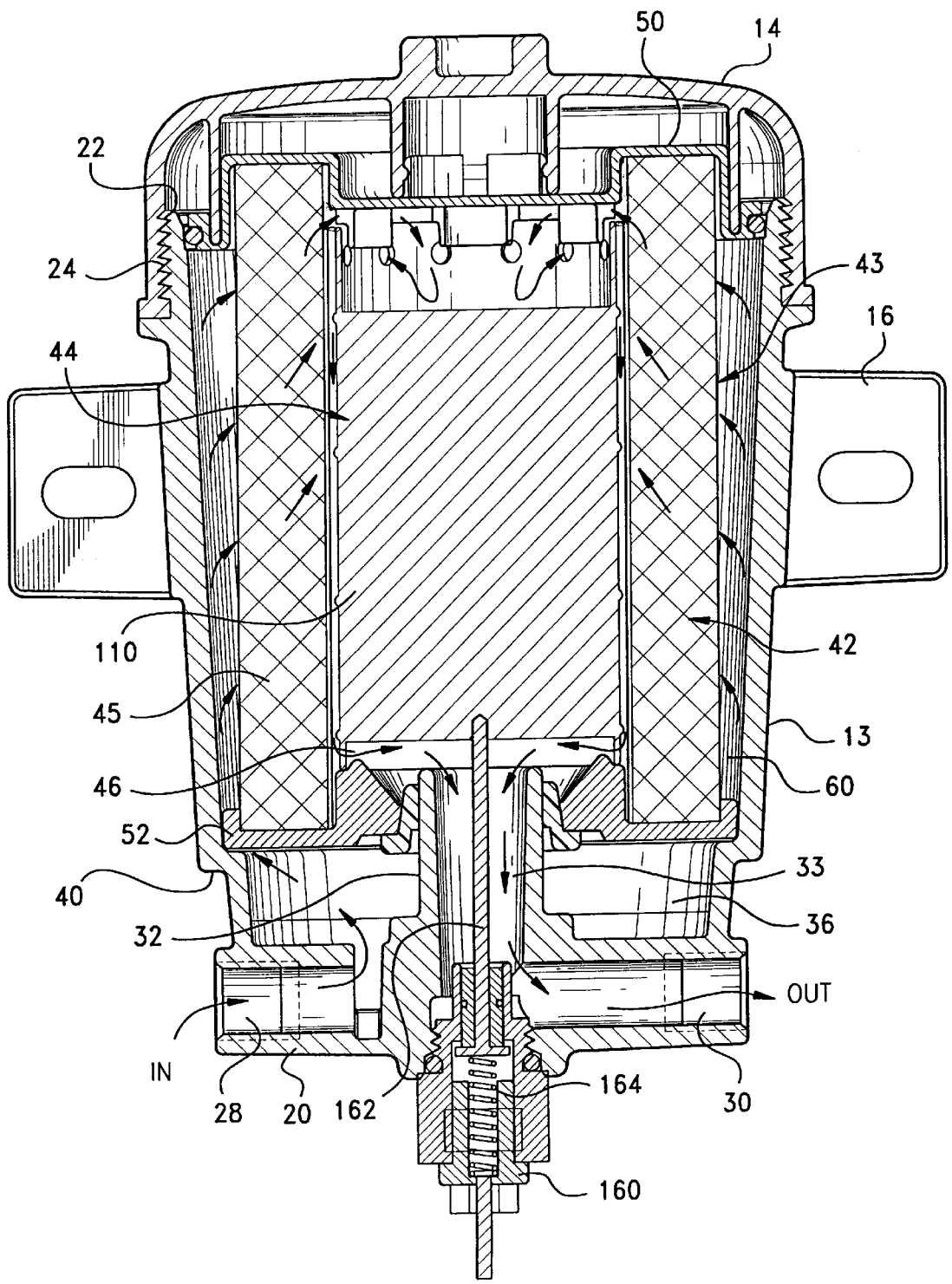
FIG. 4 is a cross-sectional side view of the assembly taken substantially along the plane described by the lines 4—4 in FIG. 2.

Referring now to FIGS. 3 and 4, the housing canister 10 includes a closed lower end 20 and an open upper end 22. The canister 13 and cover 14 have cooperating threads as at 24 and an appropriate geometry as at 25 (FIG. 1) to allow the cover to be easily screwed on to or off of the canister. The lower end of the canister includes a first port 28 and a second port 30. In a first form of the invention, port 28 is an inlet port, while port 30 is an outlet port, however, it should be understood that these ports could be reversed, that is, port 30 could be an inlet port, and port 28 could be an outlet port. In any case, the ports of the canister are connected in a liquid line, such as a parallel bypass line, in the cooling system.

A short cylindrical standpipe 32 extends centrally within housing 13 from the closed end 20 toward the open end 22. Standpipe 32 includes a central flow passage 33 fluidly connected to inlet port 28. A chamber 36 is provided in surrounding relation to the standpipe 32 in the lower portion of housing canister 13, and is fluidly connected to inlet port 28. Housing canister 13 further includes a radially inward-projecting annular shoulder 40 formed near the lower end of the canister, the reason for which will be described herein in more detail.

A recharge and filter cartridge, indicated generally at 42, is located internally of housing 12. Cartridge includes a filter element portion indicated generally at 43, and a recharge canister portion indicated generally at 44. The filter element portion 43 includes ring-shaped filter media 45 circumscribing a central cavity 46. The type of filter media appropriate for the element can be easily determined by one or ordinary skill in the art depending upon the particular application.

The filter element 43 includes a first or upper end cap 50 at the upper end of the filter media 45, and a second or lower end cap 52 at the lower end of the filter media 45. As shown in FIG. 3, the lower end cap 52 includes an annular body portion 54 fixed (e.g., bonded with adhesive) to the lower end of the filter media 45, and defining a central circular opening 56. A resilient annular seal 58 is carried by the lower end cap 52, and bounds the opening 56. Seal 58 projects radially inward into sealing engagement with central standpipe 32 when the cartridge is located within the housing.

Figure 5:
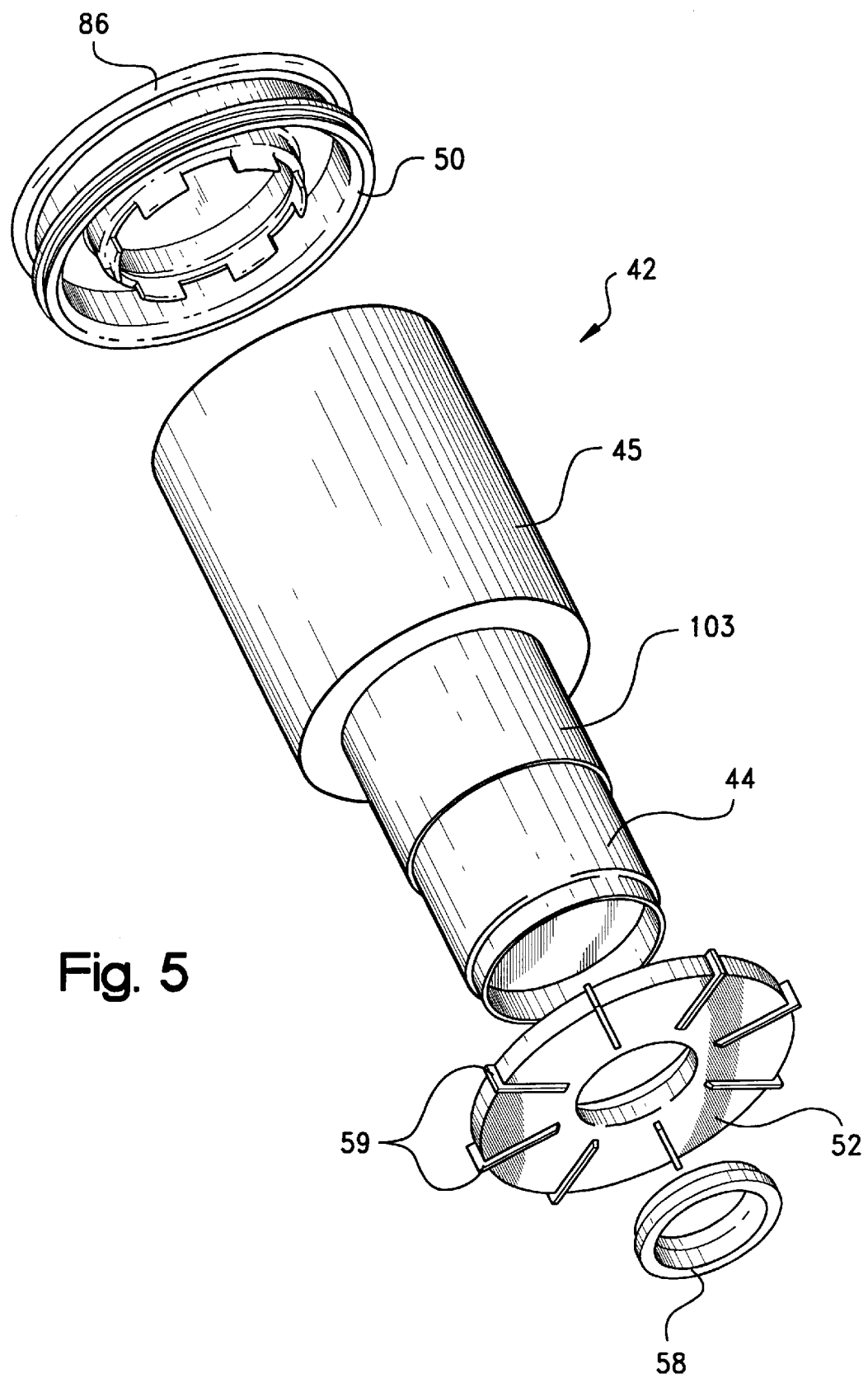
FIG. 5 is an exploded view of the recharge and filter cartridge for the assembly.

The lower end cap 52 further includes axially downwardly and radially-outward projecting ribs as at 59 (FIG. 5), which support the lower end cap on the shoulder 40 of the housing canister 13 when the cartridge is inserted within the housing. The ribs 59 define flow paths between an annular peripheral cavity 60 defined between the radially outer surface of the filter element 43 and the housing canister 13, and the cavity 36 in the lower end of the housing. The lower end cap 52 is preferably formed unitary in one piece from appropriate material (e.g., plastic) using appropriate techniques (e.g., molding).

The upper end cap 50 similarly includes an annular body portion 66 fixed (e.g., bonded with adhesive) to the upper end of the filter media 45. The upper end cap 50 includes a well area 68 extending radially inward from annular body portion 66, and fluidly closing the upper end of the element. Well area 68 includes a cylindrical side wall 70 extending axially inward along the inner diameter of the filter media 45 from the annular body portion 66, and a planar end wall 72 which is integral with the axially inner end of side wall 70. A plurality of latching fingers 74 are provided with first end cap 50, and project axially upward (outward) from the upper surface of the planar end wall 72. Latching fingers 74 are preferably located in an evenly spaced annular arrangement along the end wall 72. The latching fingers 74 of the upper end cap 50 cooperate with a mating ring 78 projecting axially downward from cover 14. Latching fingers 74 and ring 78 preferably removably couple the cartridge to the cover, such that when the cover is removed from canister 13, the cartridge is likewise removed. While ring 78 is shown as a continuous annulus, it should be appreciated that other structure (such as discrete fingers) could be provided on the cover to couple the cartridge to the cover.

Figure 6:
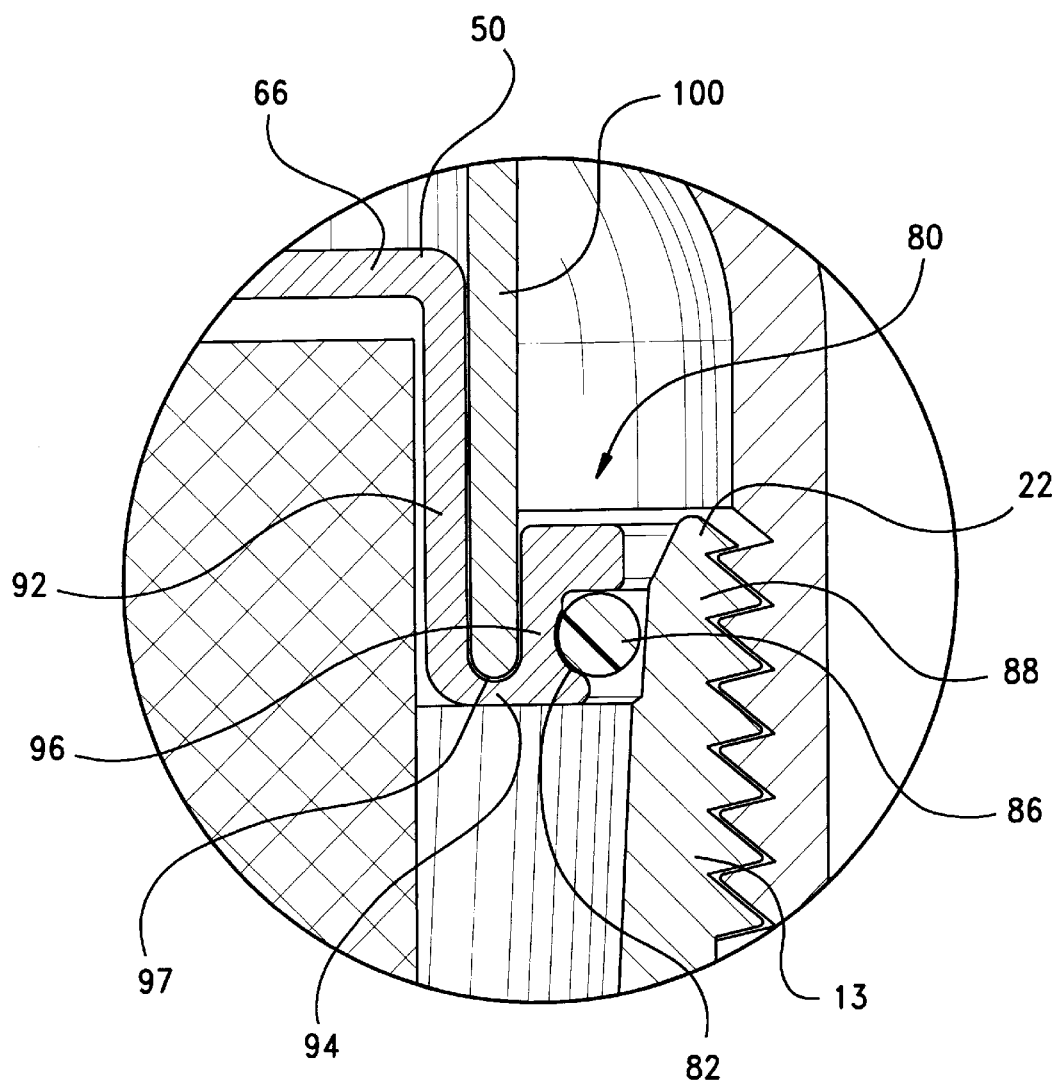
FIG. 6 is a cross-sectional, enlarged view of a portion of the assembly of FIG. 3.

As shown in FIG. 6, the upper end cap 50 further includes a radially outward-projecting flange portion, indicated generally at 80. Flange portion 80 includes a radially outward-facing groove 82, and a resilient annular O-ring gasket 86 is located in groove 82. O-ring gasket 86 projects radially outward from the groove, and provides a fluid-tight seal against a gland portion 88 proximate open end 22 of canister side wall 13. The flange portion includes a cylindrical portion 92 extending axially downward from the annular body portion 66 and bounding the radially outer surface of filter media 44. An annular end wall portion 94 is provided at the inner, lower end of the cylindrical portion 92, and projects radially outward therefrom. A cylindrical portion 96 then extends axially upward from the radially-outer periphery of end wall 94. The cylindrical portion 96 extends in radially outward-spaced relation to cylindrical portion 92, to define an annular channel or groove 97. The upper end cap 50 is also preferably formed from appropriate material (e.g., plastic) using appropriate techniques (e.g., molding).

Cover 14 includes an annular, axially-extending support wall 100 formed integral (unitary) with the cover. The support wall is closely received within channel 97 and abuts end wall 94. The wall is bounded on its inner diameter by cylindrical wall portion 92, and at its outer diameter by cylindrical wall portion 96. Support member 100 supports the upper end cap 50 in the housing, particularly during high pressure operation. In addition, the location of the support wall 100 proximate to seal 86 facilitates maintaining a proper seal between the upper end cap 50 and the housing canister 13.

The mating ring 78 on cover 14 extends into abutting relation to planar end wall 72 of the upper end cap to provide additional axial support for the upper end cap.

A cylindrical imperforate weir 103 is provided internal to filter media 45 to support the inner diameter of the media. Weir 103 extends axially upward from lower end cap 54 toward upper end cap 50. An annular flow passage, indicated at 105 (FIG. 3), is provided between the upper end of the weir and the upper end cap 50. Alternatively, the weir can extend entirely to upper end cap 50, with the upper end of the weir being perforated or otherwise allowing fluid communication between recharge canister 44 and filter media 45. In any case, the weir 103 is preferably fixed to lower end cap 52 such as by the same adhesive fixing the media to the end cap.

Recharge canister 44 includes a cylindrical body portion 110 enclosing appropriate inhibitor material. Membranes can be provided on one or both axial ends of the body portion which degrade over time and expose the inhibitor material to the fluid flowing through the assembly. An upper annular side wall 112 extends axially upward from an upper end of the body 110, and includes a series of flow openings as at 113, preferably equally-spaced around the side wall. The upper end of side wall 112 seals against the upper end of weir 103, which can have a radially-inward directed annular flange 114 for this purpose. A lower annular side wall 115 extends axially downward from a lower end of body 110. Body 110 has an outer diameter such that an annular flow passage 118 is provided between body 110 and weir 103. Preferred recharge canisters are commercially available from Long Manufacturing Ltd. of Oakville, Canada, and the structure and operation of such canisters is illustrated and described, for example, in U.S. Pat. Nos. 4,024,268; 4,782,891; and 4,333,516. Other recharge canisters than these may of course be appropriate, depending upon the particular application.

A series of tabs 120 are provided in upper end cap 50, and project axially downward from the lower surface of planar end wall 72, radially inward of media 45. Tabs 120 are preferably equally-spaced around the end wall in an annular array, and each includes an outwardly-directed shoulder as at 124 (seen best in FIG. 4) which closely receives and inwardly bounds the upper side wall 112 of the recharge canister. The shoulder 124 supports the side wall in a spaced-apart manner from end wall 72, such that a series of flow openings, as at 125, are defined between the tabs. It should be appreciated that flow openings 125 are closely adjacent annular flow passage 105 provided between the upper end of the weir and the upper end cap.

The lower end cap 52 similarly includes a series of tabs 130 which project axially upward from the annular portion 54, radially inward of media 45. Tabs 130 are also arranged in an annular array and each includes a shoulder 131 which closely receives and inwardly bounds the lower side wall 115 of the recharge canister. The shoulder 131 supports the side wall in a spaced-apart manner from the second end cap such that a series of flow openings as at 132 are defined between the tabs. While tabs 120 of upper end cap 50 generally extend in a circumferential direction, tabs 130 of lower end cap 52 generally extend in a radial direction.

The fluid flow to be recharged and filtered enters through the housing inlet 28 and passes through the flow paths defined between the ribs 59 on the lower end cap 52 into the peripheral flow passage 60 between the filter element and canister. The flow then passes radially inward through the filter media 45, where the flow is filtered, and then passes through the flow passage 105 defined between the upper end cap and the upper end of the weir and through the flow openings 125 defined between tabs 120. The liquid then comes into contact with the inhibitor at the upper end of the recharge canister, where the liquid is recharged as necessary. The recharged liquid then flows through the flow openings 113 in the upper annular side wall of the recharge canister, and downwardly through the flow passage 118 defined between the recharge canister and the weir. The flow then passes through the passages 132 defined between the tabs on the lower end cap, and enters the passage 33 in central standpipe 32, where the flow then passes to the housing outlet 30. Again, inlet port 28 and outlet port 30 can be reversed, and the flow can go in the opposite directions through the media.

If necessary or desirable, a temperature sensor/switch, indicated generally at 150, can be provided in fluid communication with the outlet flow through port 30 to provide temperature information to the user. In addition, a switch assembly, indicated at 160, can be provided having an elongated rod 162 biased by spring 164 into contact with the lower end of body 110 of recharge canister 44. When the cartridge 42 is properly located within the housing, the switch 160, through the movement of rod 162, provides an appropriate indication to the user. As the inhibitor in the canister is spent, the bottom membrane of the recharge canister will begin to corrode, thereby weakening the membrane to the point where the rod 162 will break through the membrane. When this happens, the switch can provide an indication to the user that the cartridge 42 needs to be replaced.

Figure 7:
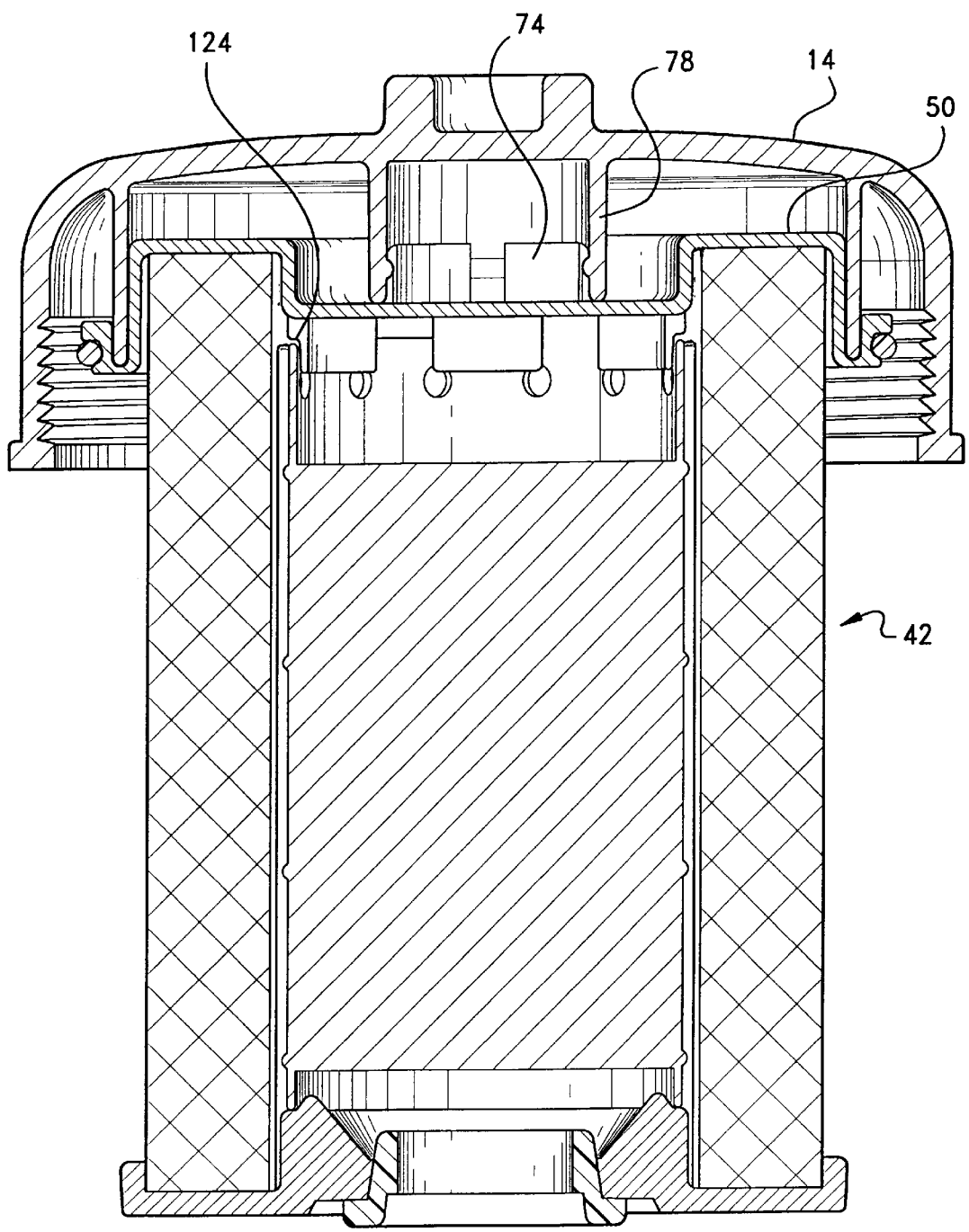
FIG. 7 is a cross-sectional side view of the recharge and filter cartridge shown coupled to the cover of the housing.

To remove and replace a spent cartridge, the cover 14 is removed, i.e., unscrewed from canister 13, thereby also removing the cartridge 42, as shown in FIG. 7. Again, the mating ring 78 on cover 14 cooperates with latching fingers 74 on upper end cap 50 to remove the cartridge with the cover. The cartridge can then be easily removed from cover 14 by simply pulling the cartridge away from the cover, and replacing the cartridge with a fresh cartridge.

While it is described above that the present invention provides a combination recharge canister and filter element to recharge and filter liquid coolant, it should be appreciated that the filter element could be used independently of the recharge canister to provide filtration of liquid in other types of fluid systems.

Thus, as described above, a compact and integral recharge and filter assembly is provided, where the assembly includes a recharge and filter cartridge as a single component that can be easily accessed and removed when spent, and recharges liquid coolant and removes particulates and other harmful contaminants from the liquid. The assembly is robust and dependable, and has components that are relatively easy to manufacture, low in manufacturing and maintenance costs, and have a long life.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element, comprising:
   a ring of filtration media having a first end, a second end, and circumscribing a central cavity;
   a first imperforate end cap fixed to the first end of the media ring, said first end cap including an annular body portion fixed to the first end of the media ring, and a central portion extending radially inward of the annular body portion, an annular resilient seal carried by the first end cap and bounding a radially outer periphery of the annular body portion, and an annular channel radially disposed outwardly of the ring of filtration media and between the annular body portion and the seal, said annular channel opening axially outward in a direction of the first end, and
   a second end cap at the second end of the media ring.

2. The filter element as in claim 1, wherein the first end cap includes a cylindrical portion outwardly bounding the media ring and extending axially from the first end cap toward the second end cap, and an annular flange projecting radially outward from the cylindrical portion and including a radially-outward facing groove bounding the annular flange, the seal received in the groove.

3. The filter element as in claim 2, wherein the annular flange includes an annular, radially-extending end wall portion and an annular, axially extending outer wall portion, the outer wall portion being spaced from the cylindrical portion and together with the end wall portion, defining the annular channel.

4. The filter element as in claim 1, wherein the central portion of the first end cap defines a well area radially inward of the annular body portion, and a series of latching fingers project axially outward from the well area.

5. A recharge and filter assembly including the filter element as in claim 1, and a recharge canister carried internally of the filter element.

6. The recharge and filter assembly as in claim 5, wherein said recharge canister is supported by said first and second end caps.

7. The recharge and filter assembly as in claim 6, wherein said first end cap includes a series of tabs projecting axially inward from the first end toward the second end, said tabs disposed in an evenly-spaced array around the well area and supporting one end of said recharge canister.

8. The recharge and filter assembly as in claim 7, wherein said tabs support the end of the recharge canister in spaced apart arrangement from the well area, such that a series of flow openings are provided between the tabs of the first end cap.

9. The recharge and filter assembly as in claim 8, wherein said tabs each includes a radially-outward facing shoulder, and said recharge canister includes an annular end wall at a first end of the recharge canister facing the first end of the media ring, said shoulders of the tabs of said first end cap supporting the annular end wall at the first end of the recharge canister.

10. The recharge and filter assembly as in claim 9, wherein said second end cap also includes a series of tabs projecting axially inward from the second end toward the first end, said tabs of said second end cap each including a radially-outward facing shoulder, and said recharge canister includes an annular end wall at a second end of the recharge canister facing the second end of the media ring, said shoulders of the tabs of said second end cap supporting the annular end wall at the second end of the recharge canister.

11. The recharge and filter assembly as in claim 5, wherein an annular flow gap is provided between the recharge canister and an inner surface of the filter element.

12. The filter element as in claim 1, wherein said second end cap also includes an annular body portion fixed to the second end of the filter media ring, said annular body portion bounding a central opening for receiving a standpipe, and a resilient seal carried by said second end cap and bounding the central opening, and a series of radially and axially outward projecting ribs on an axially-outward facing surface of the second end cap.

13. A recharge and filter assembly including a housing with an inlet and an outlet, and a filter element disposed within the housing, said filter element including:
   a ring of filtration media having a first end, a second end, and circumscribing a central cavity;
   a first end cap fixed to the first end of the media ring, said first end cap including an annular body portion fixed to the first end of the media ring, and a central portion extending radially inward of the annular body portion, an annular resilient seal carried by the first end cap and bounding a radially outer periphery of the annular body portion in sealing relation to with the housing, and an annular channel radially disposed outwardly of the ring of filtration media and between the annular body portion and the seal, said annular channel opening axially outward in a direction of the first end and receiving a support member from the housing, and
   a second end cap at the second end of the media ring.

14. The recharge and filter assembly as in claim 13, wherein said housing includes a housing canister with a closed end and an open end, and a cover removeably attached to the open end of the canister, said support member being part of the cover and supporting the first end cap when the cover is attached to the canister.

15. The recharge and filter assembly as in claim 14, wherein the support member comprises an annular support member.

16. The recharge and filter assembly as in claim 14, wherein said seal is in sealing relation with the housing canister, proximate the open end of the canister.

17. The recharge and filter assembly as in claim 14, wherein the first end cap of the filter element includes a cylindrical portion outwardly bounding the media ring and extending axially from the first end cap toward the second end cap, and an annular flange projecting radially outward from the cylindrical portion and including a radially-outward facing groove bounding the annular flange, the seal received in the groove.

18. The recharge and filter element as in claim 17, wherein the annular flange includes an annular, radially-extending end wall portion and an annular, axially extending outer wall portion, the outer wall portion being spaced from the cylindrical portion and together with the end wall portion, defining the annular channel.

19. The recharge and filter element as in claim 14, wherein the central portion of the first end cap defines a well area radially inward of the annular body portion, and a series of latching fingers project axially outward from the well area toward the cover, and the cover includes a series of latching fingers projecting axially inward toward the filter element, and cooperating with the latching fingers from the first end cap to couple the filter element to the cover.

20. The recharge and filter assembly as in claim 13, further including a recharge canister carried internally of the filter element.

21. The recharge and filter assembly as in claim 20, wherein said recharge canister is supported by said first and second end caps.

22. The recharge and filter assembly as in claim 21, wherein said first end cap includes a series of tabs projecting axially inward from the first end toward the second end, said tabs disposed in an evenly-spaced array around the well area and supporting one end of said recharge canister.

23. The recharge and filter assembly as in claim 22, wherein said tabs support the end of the recharge canister in spaced apart arrangement from the well area, such that a series of flow openings are provided between the recharge canister and the well area between the tabs, the flow openings between the tabs in fluid communication with an annular inner flow path defined between the recharge canister and an inner surface of the media ring.

24. The recharge and filter assembly as in claim 23, wherein said tabs each includes a radially-outward facing shoulder, and said recharge canister includes an annular end wall at a first end of the recharge canister facing the first end of the media ring, said shoulders of the tabs of said first end cap supporting the annular end wall at the first end of the recharge canister.

25. The recharge and filter assembly as in claim 24, wherein said second end cap also includes a series of tabs projecting axially inward from the second end toward the first end, said tabs of said second end cap each including a radially-outward facing shoulder, and said recharge canister includes an annular end wall at a second end of the recharge canister facing the second end of the media ring, said shoulders of the tabs of said second end cap supporting the annular end wall at the second end of the recharge canister, and a series of flow paths are provided between said tabs of said second end cap, said flow paths between said tabs in fluid communication with the annular flow path between the recharge canister and the inner surface of the media ring.

26. The recharge and filter assembly as in claim 20, wherein an outer lower flow path in fluid communication with the inlet is provided between the second end cap and the housing; an outer annular flow path in fluid communication with the outer lower flow path is provided between the housing and a radially outer surface of the media ring; an inner upper flow path in fluid fluidly separate from the outer annular flow path is provided into one end of the recharge canister; an inner annular flow path provided between a radially inner surface of the media ring and the recharge canister; and an inner lower flow path, fluidly-separate from the outer lower flow path, and in fluid communication with the outlet, is provided between the recharge canister and the second end cap and the housing.

27. The recharge and filter assembly as in claim 13, wherein said second end cap also includes an annular body portion fixed to the second end of the filter media ring, said annular body portion bounding a central opening, and a resilient seal carried by said second end cap and bounding the central opening.

28. The recharge and filter assembly as in claim 27, wherein said housing includes a central standpipe having a central flow passage and extending from one end of the housing toward the other, said standpipe received in the central opening of the second end cap, and the seal in the second end cap sealing to the standpipe.

29. The recharge and filter assembly as in claim 13, wherein said second end cap includes a series of radially and axially projecting ribs on an axially-outward facing surface facing in a direction axially away from the second end.

30. The recharge and filter assembly as in claim 1, wherein said housing includes a radially-inward projecting shoulder supporting said ribs on the second end cap of the filter media.

31. The recharge and filter assembly as in claim 30, wherein said housing includes a radially-inward projecting shoulder supporting the second end of the filter media.

* * * * *